Patented Feb. 9, 1954

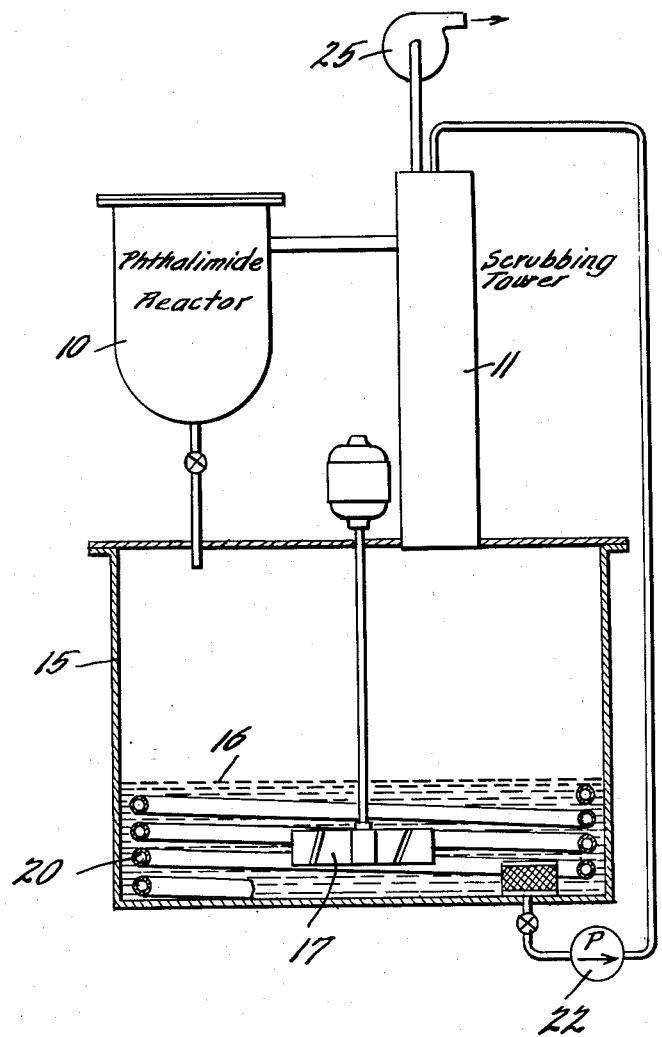

2,668,326

UNITED STATES PATENT OFFICE 2,668,326

PROCESS FOR THE PREPARATION OF PHTHALIMIDE

George F. Schlaudecker, Toledo, Ohio, assignor, by mesne assignments, to Maumee Development Company, Toledo, Ohio, a corporation of Ohio Application August 3, 1951, Serial No. 240,151

2 Claims. (Cl. 18—47.2)

This invention relates to an improved process for the manufacture of phthalimide, and has for an object the production of phthalimide in high purity and in approximately quantitative yield in a porous granular form which is excellently suited for further processing because of its extensive surface area.

In the past, phthalimide has been produced by passing anhydrous gaseous ammonia into molten phthalic anhydride until absorption of ammonia ceased and a sample of the molten mass gave the required melting point for pure phthalimide. The molten phthalimide was then poured into suitable receptacles, allowed to solidify, and the solid masses broken up and ground to a powder. The dust formed during grinding was very irritating to the membranes of the eye, nose and throat. Furthermore, the powdered material so produced failed to dissolve readily for further processing, due to lumping when first moistened. Moreover, during the formation of phthalimide from phthalic anhydride, one molecule of water was formed for each molecule of phthalimide produced. The release of steam to the atmosphere, required for complete reaction, resulted in steam distillation or sublimation of a part of the phthalimide as a fine fog or dust, giving rise to both a loss of end product and a health hazard because of the irritating properties of the evolved phthalimide.

It has been proposed to avoid these difficulties by subliming the entire reaction mass, and condensing the sublimate. However, this requires the use of bulky and expensive equipment and produces a light, fluffy material which does not pack well and has too low a bulk density for economical shipping. Furthermore, considerable heat is required to vaporize the phthalimide, which heat is lost in the condensers.

In the preferred practice of the present invention, the process is carried out in a system which is essentially closed, phthalimide previously lost in the steam evolved by the reaction being recovered in a suitable gas and liquid contact apparatus such as a wet scrubber. At the completion of the reaction, the molten phthalimide remaining in the reaction vessel is quenched in a suitable liquid, preferably the same liquid employed in the wet scrubber, the liquid being agitated vigorously during the quenching step. If desired, the same scrubbing tower may be used to recover both the phthalimide vapors evolved during the initial reaction and the vapors evolved during quenching, and the slurry of phthalimide withdrawn from the scrubber may be used as the quenching medium, the latter being continuously circulated, and being cooled as desired.

By the use of this method, a finely divided granular phthalimide is produced quickly and effectively, the individual particles being irregular and porous, and having an extensive surface of more than twice the area resulting from the grinding of solid phthalimide to equal particle size. Contrary to what might be expected, the process may be carried out with little or no decomposition of phthalimide during quenching. The slurry so obtained may be used as such in further processing, or the phthalimide may be filtered off and dried in conventional equipment. The dried phthalimide so prepared is porous, free flowing, and practically dustless, characteristics which are highly desirable, especially in the further processing of the product to dyestuff and other intermediates.

The invention is not dependent upon the use of any specific type or arrangement of equipment. Thus the reaction between phthalic anhydride and ammonia may be carried out in the conventional manner in any suitable heated vessel, the evolved steam and phthalimide vapors being conducted to a scrubbing tower or like gas and liquid contact apparatus. In the interest of economy, it is desirable to recirculate the scrubbing liquid, but the cooling of the liquid is optional, depending on the total quantity available and the amount of heat to be removed. The vessel in which quenching is effected may be any closed container or tank equipped with mechanism for agitating the quenching liquid or coolant, and while cooling of the liquid is preferable, it is not essential.

The amount of liquid required for quenching the molten phthalimide is not critical, but should be at least sufficient to absorb the heat stored in the product. Any liquid may be employed in the scrubbing tower and quenching tank that does not decompose thermally when in contact with the molten phthalimide. Water is obviously suitable for this purpose, and high boiling hydrocarbons are quite effective, but since no chemical reaction is involved, liquid coolants of widely varying nature may be used.

The invention is described in detail in the following specific examples, which are illustrative only and not intended to restrict or limit the scope of the invention as elsewhere defined.

*Example 1.*—Phthalic anhydride is charged into a reaction vessel, melted, and gaseous ammonia is passed through the molten mass until absorption of ammonia ceases, indicating completion of the reaction. The vapors evolved are conducted to a scrubbing tower through which water, a high boiling hydrocarbon, or any other suitable liquid is passed. The slurry withdrawn from the tower may be filtered to recover the suspended phthalimide, but is preferably recirculated through the tower, the quantity of liquid being so adjusted that the slurry is thin enough to handle readily. In the event a high boiling liquid is employed, it is desirable to cool the same in order to lower the partial pressure of the phthalimide.

*Example 2.*—Molten phthalimide, prepared as in Example 1, is run directly into a closed tank containing water, the water being vigorously agitated to insure immediate dispersion of the phthalimide, whereby the latter is rapidly cooled and solidifies almost instantly into granules which are dense but porous. Any other suitable liquid, such as a high boiling hydrocarbon, may be substituted for the water as the liquid coolant. The steam and vapors evolved during this quenching step are conveyed to a scrubbing tower which is operated in the manner described in Example 1.

Twenty-five gallons of water may be employed to quench each 100 pounds of phthalimide, but the amount of quenching liquid may vary widely depending upon the type of agitation employed and on the desired consistency of the resulting slurry. Obviously, enough liquid should be used to produce a slurry which is sufficiently thin to suspend easily and to handle readily.

The temperature of the quench liquid is not critical and cooling is not necessary, since boiling of the liquid merely results in the release of heat from the quenching vessel. The slurry may be used for further processing, or may be filtered to recover the phthalimide which is dried by conventional methods. The purity of the phthalimide is not affected by this treatment, and the resultant free flowing, dense, granular but porous product may be readily reslurried or dissolved in suitable reagents.

*Example 3.*—The scrubbing tower of Example 1 may be advantageously coupled with the quenching vessel of Example 2, so that the scrubbing liquid may be stored in the quenching vessel and there employed for quenching, and continuously recirculated through the scrubbing tower. Thus the scrubbing tower serves to recover phthalimide vapors evolved during both the initial reaction and the quenching step, so that all of the phthalimide is recovered and returned to the quench tank with attendant improvement in yield, which becomes practically quantitative.

As pointed out hereinbefore, the apparatus employed in the practice of the invention may vary widely, but a preferred arrangement of equipment is illustrated diagrammatically in the accompanying drawing, in which the essential components are designated by legend. The method practiced with the use of the illustrated apparatus is that heretofore described.

Thus molten phthalic anhydride and ammonia are intimately contacted in reactor 10 until the reaction is completed, vapors evolved during the reaction being conducted to scrubbing tower 11. The molten phthalimide is then released into quench tank, the coolant 16 in the tank being concurrently agitated by mixer 17 and being cooled, if desired, by cooling coils 20. Vapors released during quenching are drawn upwardly by fan 25 within scrubbing tower 11, which may be in direct communication with tank 15. Scrubbing liquid is supplied under pressure to tower 11 by pump 22, the coolant in the quench tank 15 being used for this purpose as well. Liquid and entrained phthalimide discharges into tank 15, so that the latter serves as a supply reservoir for the scrubbing tower. The system is closed except during quenching when fan 25 is operated to discharge excess coolant vapor.

It will be appreciated that the foregoing detailed descriptive matter is not intended to limit the scope of the invention. Such changes and alterations in the preferred method of practicing the invention as would occur to those skilled in the art are contemplated as part of the invention.

Having thus described the invention, what is claimed as new and desired to be secured by Letters Patent is:

1. The process of preparing phthalimide in porous granular form which includes the steps of quenching molten phthalimide in a liquid coolant while agitating the coolant, and contacting with a scrubbing liquid the vapors evolved during quenching to recover vaporized phthalimide.

2. The process of preparing phthalimide in porous granular form which includes the steps of quenching molten phthalimide in a liquid coolant while agitating the coolant, contacting with a scrubbing liquid the vapors evolved during quenching, and returning the liquid and entrained phthalimide to said liquid coolant.

GEORGE F. SCHLAUDECKER.

References Cited in the file of this patent

UNITED STATES PATENTS

| Number | Name | Date |
| --- | --- | --- |
| 1,348,140 | Howell | July 27, 1920 |
| 1,782,038 | Haak | Nov. 18, 1930 |
| 2,304,221 | Walsh | Dec. 8, 1942 |

OTHER REFERENCES

Hackh's Chemical Dictionary, Third Edition, 1944, published by The Blakiston Company, Philadelphia, page 654.